Jan. 13, 1948. L. M. HICKS 2,434,614
THERMOPLASTIC SYNTHETIC RESIN OPTICAL LAP
Filed Nov. 11, 1944
FIG. 1.
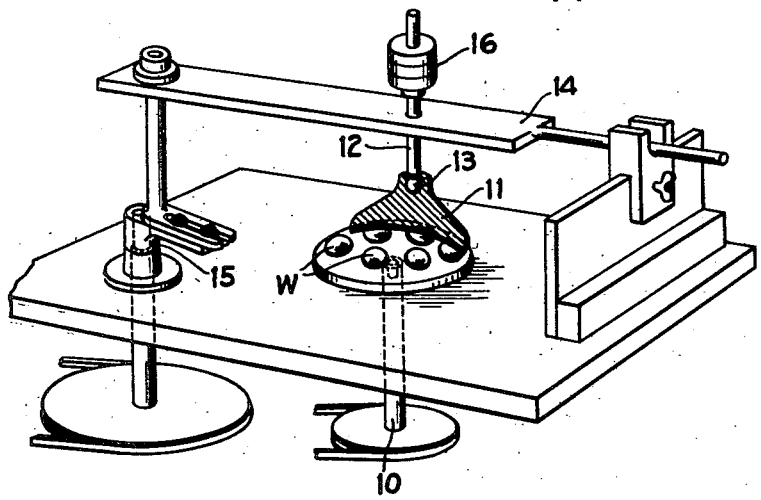
FIG. 2.
FIG. 3.
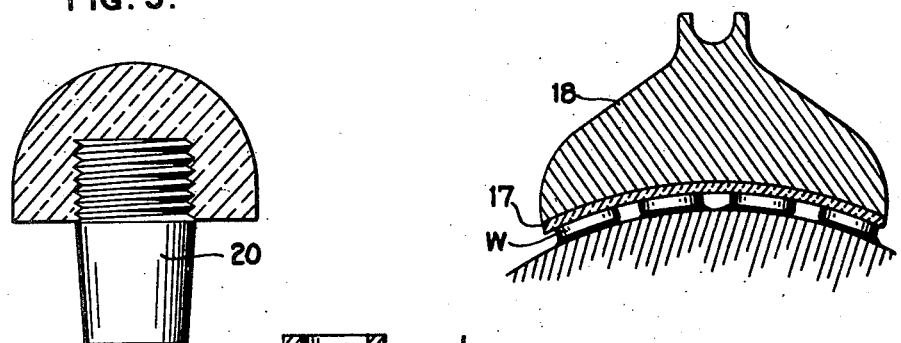
FIG. 4.
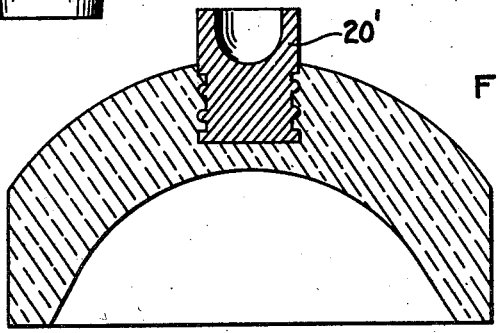
LESTER M. HICKS
*INVENTOR*
BY
*ATTORNEYS*

Patented Jan. 13, 1948

2,434,614

UNITED STATES PATENT OFFICE 2,434,614

THERMOPLASTIC SYNTHETIC RESIN OPTICAL LAP

Lester M. Hicks, Rochester, N. Y., assignor to Eastman Kodak Company, Rochester, N. Y., a corporation of New Jersey Application November 11, 1944, Serial No. 563,024

7 Claims. (Cl. 51—303)

The present invention relates to an abrading lap and the method of making the same, and particularly to an abrading lap used for grinding and polishing optical surfaces on solid optical material and a method of abrading resulting from the use thereof.

For many years prior to the present invention, it has been customary to polish optical glass, after a fine-ground surface has been obtained thereon, by the use of polishing lap composed of natural resinous materials of various compositions. This polishing lap is cemented to an iron "shell" or support, of the proper curvature or flatness, and connected to a spindle of a grinding apparatus, generally by a ball-and-socket joint. This "pitch" lap is then used to rub the surface of the glass, carrying a water suspension of rouge or other polishing material, until the glass lens or prism is polished to the desired conditions of test and polish.

The composition and manner of mixing the "pitches" used in these pitch laps have been considered more or less as trade secrets in the optical industry and have varied with each job and so-called expert in the art in charge of the fabrication of the pitch. Among other things, however, conventional "pitches" are known to include such materials as asphalt, coal tar, pine tar, rosin, beeswax, paraffine, shellac, turpentine, etc. in different proportions. It is further known that the batches of "pitch" required considerable cooking and that this cooking time and/or turpentine content was varied to alter the consistency or "temper" of the "pitch" lap as regards to flowing under operating conditions. By reason of the materials used in making "pitch" laps these laps have been rather soft and would show considerable flow at temperatures over 90–95° F. when encountered under polishing conditions which include pressure and a rubbing action.

This softness of the "pitch" laps naturally limited the spindle speeds and pressures that could be used, and, as I have found, was the main cause of the usually long times required to polish out an optical surface even after it had been fine ground. Even if it was known or appreciated that higher spindle speeds would give a faster polishing action, this fact was not made use of over the past many years because it was not discovered how to make the "pitch" laps more rigid, or how to increase their softening points, without introducing other intolerable disadvantages such as staining, scratching, or striping of the glass, or having it dry up too quickly. The term "stain" as used in the optical industry, generally refers to a flaw caused by the leaching of some component of the glass from the polished surface or material stuck to or reacted with the polished surface. By a "stripe" is meant a very minute scratch which is not always visible to the naked eye.

Furthermore, the experts in the art considered it necessary to have a "pitch" lap which would flow at a known rate at certain temperatures because they used this flow characteristic primarily as a means of controlling the test of a surface being polished. The term "controlling test" is fairly well known in the optical grinding and polishing art and means varying the abrading action on the surface being worked at selected points known to be over or under worked in order that the final surface when put on a test plate will conform to said test plate within specified tolerances, such tolerances generally being specified in numbers of Newton rings.

For example, by experience an expert operator would score or cut away the surface of the polishing lap in a certain way and by a certain amount before he started to polish the work in order to account for unequal grinding actions at different points over the surface he knew would be encountered with a given type of polishing machine. At regular intervals during the polishing operation the operator would check the work for test, and if he found that there was an area which was getting too much grinding action he would cut away, or score, the proper portion of the lap to alleviate this condition. This would cut down the grinding action on this portion of the work until the cut-away portion of the lap was flowed shut, and knowing the flow characteristics of the pitch and the type of work being done, the operator would attempt to make the score such that it would flow shut at about the time the rest of the surface was brought into correspondence with the portion in question. It will be obvious that this method of controlling the test of an optical surfact was one which was learned only from experience and was enjoyed only by those operators who were veterans and skilled in the art. Even with the expert operator, however, it requires several hours, and sometimes days, to polish out a lens using a "pitch" lap and this polishing technique.

One object of the present invention is the provision of an abrading lap which revolutionizes the existing grinding and polishing technique practiced in the optical industry.

Another object is to provide an abrading lap which reduces the polishing time heretofore required on a given piece of work. The use of a tool fabricated in accordance with the present invention has been found to permit reduction in the polishing time of certain types of lenses to 1/50 of the original time required for this operation.

A further object is to make an abrading lap the working surface of which comprises a cellulose derivative molding composition.

Another object is to carry out the abrading operation on a piece of work at high speed (relative rotational speed between the work and lap of 200 R. P. M. or more) using a lap of the type set forth above.

Another object is to provide an abrading lap which is composed entirely of a cellulose derivative plastic thus eliminating the use of the metal "shell" or support heretofore required. A metal insert is molded into, or otherwise affixed to, the plastic lap to provide the necessary connection between the lap and the spindle of the grinding machine.

And yet another object is to provide an abrading lap in which a layer of cellulose derivative plastic is attached to a metal "shell" and the plastic layer is held on the "shell" by the adhesive properties of the plastic. The "shell" is heated sufficiently high to raise the temperature of the plastic adjacent the same above its softening point, and the pressure applied to the plastic by a die to form the desired working surface therein causes the plastic lap to stick to the "shell."

Another object is to provide a plastic polishing lap which is composed of layers of compatible plastic material having different softening temperatures so that the plastic mass is adapted to be stuck to the "shell" and at the same time present a roughened working surface.

And another object is to make the cast-iron "shells," heretofore used in fine grinding optical surfaces, from a cellulose derivative plastic material.

And still a further object is to provide an abrading lap of a cellulose derivative plastic the composition of which is such that the working surface has no noticeable flow or distortion under the conditions of temperature and pressure encountered in use. Accordingly, a lap made according to the present invention is provided with a working surface which is accurately formed to be the complement of the desired optical surface so that the glass surface is ground to conform to the contour of the lap whereas in prior "pitch" abrading tools the working surface of the lap flows to conform to that of the work.

The novel features that I consider characteristic of my invention are set forth with particularity in the appended claims. The invention itself, however, both as to its organization and its methods of operation, together with additional objects and advantages thereof, will best be understood from the following description of specific embodiments when read in connection with the accompanying drawings in which, Fig. 1 is a perspective view, partially in section, of a polishing machine of the conventional type used in the optical industry, and showing the polishing lap as being oscillatible over the surface of the work which is in turn rotated under the lap by a driven spindle, Fig. 2 is a sectional view of a conventional polishing lap and having a layer of cellulose derivative plastic material affixed to a metal "shell" and forming the working surface. The lap is shown in operative position relative to a block of work consisting of a group of lenses mounted on a block by pitch buttons.

Figs. 3 and 4 are sectional views showing typical types of polishing laps which are composed entirely of a cellulose derivative plastic and having metal bearing inserts affixed thereto for connecting the lap to the spindle of the polishing machine. In Fig. 4 the bearing insert is shown of the socket type for cooperation with a ball on the driving spindle and being molded into the lap proper. In Fig. 3 the bearing insert is shown of the conical type which might be used if the lap is to be mounted below the work and be connected to the driving spindle by a frictional engagement. In the latter case the bearing insert is affixed to the plastic body by being threaded thereinto rather than being molded in place as in the case of the lap shown in Fig. 4.

Like reference characters refer to corresponding parts throughout the drawings.

The desirable characteristics of a good polishing lap are (1) it will not stain the glass, (2) it will not scratch, (3) it will not stripe, (4) it will polish rapidly, and (5) it will not dry up too rapidly. I have found that a polishing lap made of a cellulose derivative molding composition or a thermoplastic synthetic resin molding compound has all of these desirable characteristics, and that under the same operating conditions laps having working surfaces composed of these materials will polish at least twice as fast as a "pitch" lap and outlast the latter many fold. In addition, a cellulose derivative plastic or a thermoplastic synthetic resin polishing lap permits operating speeds and pressures which "pitch" laps are unable to stand and which have been found to effect a reduction in polishing time as much as fifty times that necessary with "pitch" laps.

Inasmuch as cellulose derivative compositions and synthetic resin compositions have come to be recognized as having a status in the art distinct from one another, along with the fact that there is no suitable general term for the two materials, they are being disclosed in separate applications. This application is limited to the use of a cellulose derivative molding composition as the working surface of an abrading lap, while the use of a thermoplastic synthetic resin for the same purpose is discolsed in my copending patent application Serial No. 563,025, filed on even date herewith, now Patent No. 2,426,215, issued August 26, 1947.

According to the present invention, a cellulose derivative plastic material is used for making a polishing lap instead of "pitch" as has been the conventional practice for many years prior to the present invention. This material itself is not only conducive to polishing a given surface at least twice as fast as "pitch" when both are operating under the same speed and pressure conditions and with the same abrasive material, but due to the fact that it normally possesses a resistance to deformation or flow greatly exceeding that of "pitch" it permits spindle speeds which "pitch" would not stand and which high speeds result in very rapid polishing. Inasmuch as the flow or deformation characteristics of cellulose derivative plastics can be readily varied over rather wide ranges, a plastic material can be found which is adaptable to any set of speed and pressure operating conditions and/or any hardness of glass which might be encountered. So far as I have been able to ascertain, there is no upper limit of spindle speed which a plastic polishing lap cannot be made to operate at unless it be considered that speed at which the particular plastic used for the lap tends to break down due to the centrifugal force involved or the high temperatures involved which exceed the softening point of the chosen plastic material.

A typical polishing machine used in the optical industry is schematically illustrated in Fig. 1. The work W to be polished or ground is mounted on a spindle 10 which is adapted to be rotated by a driving means shown as including a belt-driven pulley. The polishing lap 11 rests upon the work W and is connected to the lower end of a drive spindle 12 by a ball-and-socket joint 13 so that the lap is free to rotate. The drive spindle is in turn slidably mounted in a guide rod 14 which is connected to a crank mechanism 15 with an adjustable throw, and the purpose of which is to oscillate the lap over the work as the latter rotates. Pressure may be applied to the laps by weights 16 which are directly mounted on the spindle as shown, or which may be adjustable along a fulcrum pinned to the spindle to vary the load on the lap. With this machine the lap is oscillated over the work as it rotates and the abrasive and lubricant, such as rouge and water, is applied directly to the work and is moved over and held on the surface by the lap. The lap itself does no appreciable abrading but merely serves to hold the abrasive solution on, and move it over, the work in a prescribed curve or flat. Some polishing machines differ from the one disclosed in that the lap is placed on the bottom and is rotated while the work is pressed downwardly thereon and is oscillated thereover.

Conventional "pitch" polishing laps have been made by applying a "pitch" material to an iron "shell" having a curvature somewhere near complementary to the curve that is to be polished and then pressing the "pitch" onto the fine-ground surface of the work until it touches at all points. The "pitch" may be melted and applied to the iron "shell" in this condition so that it will stick, or it may be applied to the "shell" in the form of solidified facets by first heating the "shell" and thereafter warming the back of the facets to effect the desired adhesive action.

According to the present invention, the "pitch" formerly used on polishing laps is replaced by a cellulose derivative plastic material with the result that the polishing technique is completely revolutionized and the polishing time required is greatly reduced. In fact, the reduction in polishing time for a given piece of work by the use of a plastic polishing lap has been found to be phenomenal. For instance, a particular lens which requires from four to six hours to polish out with a conventional "pitch" lap specified for the job was polished out in six to seven minutes with a plastic lap of cellulose acetate. This is a reduction of approximately fifty times in the required polishing time. This decrease in polishing time possible with a cellulose derivative plastic lap is due in part to the fact that such a lap is itself conducive to a faster polishing action, and in a greater part to the fact that such a plastic lap permits the use of high spindle speeds which conventional "pitch" laps will not stand.

I have found that a polishing lap having a working surface comprising a cellulose derivative plastic material when used on the same piece of work under the same spindle speed and working pressure conditions and using the same abrasive material as with a "pitch" lap will polish out the piece to test at least twice as fast as the "pitch" lap specified for the job. I have further found that since a cellulose derivative plastic is less susceptible to deformation and flow than conventional "pitches" that a high spindle, or operating, speed can be maintained without the working surface of the lap deforming or without the lap breaking up, with the result that greatly reduced polishing times are required. Despite this resistance to deformation that cellulose derivative plastics possess, along with these high operating speeds, this material shows no tendency to stain, scratch or stripe the glass and does not dry up rapidly. Furthermore, a cellulose derivative plastic lap will outwear many "pitch" laps before it has to be discarded as unfit for use.

If desired, the technique of making a plastic polishing lap need not be very different from that used in making a "pitch" lap. If the cellulose derivative plastic material is obtained in granular or powdered form, as commercially available cellulose derivative plastics are, a quantity of them may be heated to or above the softening points of the material as specified by the manufacturer so that the particles will fuse into a mass. Then the fused plastic material is placed on the iron "shell" and pressed against the "shell" with a forming die the curve of the face of which will result in a polisher which will produce the curve finally desired on the polished work. It has been found that the curve of the die is somewhat dependent upon the final test tolerances, and where extremely high accuracy is required the die should be made to such a curve as will produce a polisher which will give the required test. Because these polishers do not flow, the shrinkage characteristics of the material from which they are made must be compensated for in the die. This operation not only forms the working face in the lap but causes the lap to stick to the iron "shell" by virtue of the adhesive characteristics of the plastic. To be sure that the lap sticks to the "shell" sufficiently well it is best to hold the forming die in place until the plastic is cooled sufficiently to set or become rigid. After the forming die is removed, a lap is left having a working face which is the exact complement of that desired on the final piece of work, which is different from the techinque used with "pitch" laps.

This technique is possible with the specified plastic materials because they are so resistant to flow or deformation under pressure and temperature conditions which are encountered in abrading operations. In fact, commercially available cellulose derivative plastics are available in several different degrees of softness so that it is possible to obtain a formula which is suitable for most any abrading operation which might be encountered in finishing optical surfaces on glass. As pointed out above, despite the fact that cellulose derivative plastics have a higher softening temperature than conventional "pitches," and under abrading conditions evidence no flow or deformation, they do not tend to injure the glass surface in any way.

The following cellulose derivative plastics have been tried and found to be suitable for abrading laps and to be superior to conventional "pitch" materials for the same purpose: a cellulose acetate ester in both powdered and granular form, a cellulose acetate butyrate ester in both powdered and granular form, oxidized cellulose acetate—powdered form only, and an ethyl cellulose in granular form. These are merely typical examples of cellulose derivative plastics which give the desired results and are by no means the only cellulose derivative plastics which would give the desired results, for I have reason to believe, and no reason to disbelieve, that any cellulose derivative plastic material will provide an abrading lap which is superior to conventional "pitch" laps.

Each of the enumerated plastic materials show about the same performance so far as polishing time and endurance is concerned. However, each one possesses an advantage over the others which is exclusive to itself. For instance, the cellulose acetate ester is more desirable than the others mentioned because it is less expensive in the raw state. The cellulose acetate butyrate ester is more desirable than the others mentioned because it is less susceptible to water, or has less water absorption, and this is an important feature since a water dispersion of rouge is generally used as the abrasive medium in grinding and polishing glass. The oxidized cellulose acetate is more desirable because it possesses exceptional adhesive properties when soft which facilitates sticking the plastic mass to a metal "shell."

Cellulose acetate is old and well known in the art and is made by treating especially purified cotton linters with acetic acid and acetic anhydride. Cellulose acetate plastic material is cellulose acetate with suitable plasticizer, pigments and dyes mixed therewith.

Cellulose acetate butyrate is a mixed ester of cellulose made by combining simultaneously, butyryl groups from butyric acid and acetyl groups from acetic acids. Typical formulas of cellulose acetate butyrate plastic materials are given in U. S. Patent 2,261,140, Conklin et al. which issued November 4, 1941.

Ethyl cellulose is an ether of cellulose resulting from the reaction of ethyl chloride and alkali cellulose. It is compatable with most of the plasticizers used with other cellulose derivatives and by the use of which the hardness and flow characteristics of the material may be varied.

Oxidized cellulose acetate is not yet, so far as I am aware, commercially available. The manner of making the same and its unusual adhesive properties are disclosed in pending U. S. Patent application, Serial No. 347,198, filed July 24, 1940, in the name of C. R. Fordyce et al., now Patent 2,358,064, issued September 12, 1944. A molding composition of this material can be made by adding suitable plasticizer thereto, and the particular plasticizer and the amount thereof may vary depending upon the flow characteristics desired.

The following plasticizers have been found satisfactory in making the molding composition of oxidized cellulose acetate: methyl phthalyl ethyl glycollate, triacetin, dimethyl phthalate, dibuytl tartrate, camphor, diethyl phthalate, and tripropionin. A basic formula for a molding composition of this material which was tried and found to be satisfactory for an abrading tool for a particular polishing job is as follows:

| | Parts |
|---|---|
| Oxidized cellulose acetate | 100 |
| Plasticizer | 60 |
| Rouge | 50 |

The rouge was added with the idea that it would give an increased abrading action, but it was found that it did not appreciably increase the abrading action but did aid in giving a more uniform structure to the lap made therefrom as compared with a lap made of this plastic and not containing rouge. An abrading lap of this material shows substantially the same grinding and polishing characteristics as those made from other cellulose derivative plastics, but did as pointed out above, adhere to the metal "shell" better due to the adhesive properties of the oxidized cellulose acetate.

A conventional type of polishing lap, as shown in Fig. 2, may be made by molding a layer 17 of the cellulose derivative plastic material directly on the iron "shell" 18 in the manner set forth above from the material in granular or powdered form. On the other hand, the plastic material may be obtained in, or made into, sheet form and pressed onto the heated "shell" by a forming die of the curve desired in the final surface. Or the plastic material may first be pressed into laps having the desired working surface and then be stuck to the "shells" by the use of a bonding material or by heating the "shell" above the melting temperature of the plastic and pressing the same into place on the "shell."

The following table shows results as to polishing time on a given lens with polishing laps made of the five specified cellulose derivative plastics mentioned, and a lap made of conventional "pitch" and specified for the piece of work in question. The abrasive used in each instance was rouge and water and the operating temperature was 76–78° F.

Table I

| Polishing Lap Material | Spindle Speed 132 R. P. M. 4½# wgt. | | Spindle Speed 600 R. P. M. 12½# wgt. | |
|---|---|---|---|---|
| | Lens Surface Temperature | Polishing Time | Lens Surface Temp. | Polishing Time |
| | ° F. | Minutes | ° F. | Minutes |
| Cellulose acetate molding composition (granules) | 98–105 | 90 | 140–150 | 11–12 |
| Cellulose acetate molding composition (powder) | 90–95 | 75–80 | 130–140 | 11–12 |
| Cellulose acetate butyrate molding composition (granules) | 98 | 105 | 140–150 | 12 |
| Cellulose acetate butyrate molding composition (powder) | 105–110 | 65–75 | 145–150 | 8 –9 |
| Oxidized Cellulose Acetate | 95–100 | 80–90 | 125–130 | 12 –13 |
| Ethyl cellulose molding composition granulations | 88–90 | 75–85 | 130–135 | 9½ –10 |
| Pitch | 85–95 | 210–225 | 110 | (¹) |

¹ It was necessary to keep the polisher very wet to avoid excessive flowing of the polisher due to temperature, and it also required very close attention. Under these careful conditions, the polisher would flow shut and would have to be reopened about every two minutes. After 26 minutes, the polisher began to disintegrate and became very shiny. No change was noted in the polishing action between 20 and 30 minutes, the lens still having a light "gray" surface. Polishing was stopped after 30 minutes when it was apparent the polisher would not continue to function.

It will be apparent from the data shown in this table that a cellulose derivative polishing lap will cut the polishing time more than half even with no change in spindle speed. Just why this is so I am not sure, because polishing a lens with a bare "pitch" lap and a bare plastic lap does not indicate that the latter has any more or different polishing action than the other. In fact, there is no evidence that the "pitch" or plastic lap without the addition of an abrasion medium has any polishing action whatsoever. The only reason which I can give for the differences in the degrees of polishing action is that the plastics, due to their absence of flow, tend to grip the abrasive particles and move them over the work, while at the same time allowing a particle to be completely imbedded should it tend to scratch or otherwise injure the surface; while "pitch" due to its flow characteristics tends to imbed the abrasive and/or allow it to move relative to the surface rather than holding it firmly in place.

The real advantage of the cellulose derivative plastics as polishing laps is brought out by the higher polishing speeds that they permit. Just stepping the spindle speed up to 600 R. P. M. from 132 R. P. M. effects a reduction in polishing time from 210-225 minutes to 11-12 minutes, or reduces the polishing time about twenty times. If the spindle speed were increased still further the polishing time would be further reduced, but obviously the reduction in time would not be reduced proportionately as fast as the speed was increased. So far as I am aware, there is no limit to spindle speed or normal operating pressure which a cellulose derivative plastic cannot be found to withstand. I do not mean to infer that a given plastic material having a certain flow characteristic will be suitable for all abrading operations regardless of the hardness of the glass being abraded or the combined operating speed and pressure used, but I mean that for any job in question regardless of the operating speed and pressure used, a plastic material can be found having flow characteristics which will make it possible for a lap made therefrom to operate satisfactorily. Conventional "pitches" tend to break down at spindle speeds above 132 R. P. M. and, therefore, have been the limiting factor on spindle speeds and polishing times up to the present time.

To determine whether or not the heat generated by the higher spindle speed was a contributing factor in decreasing polishing time, an experiment was run at a higher temperature by directing heat lamps on the lens during polishing. Results of an approximate 40° F. temperature rise produced by this technique, showed no change in polishing time, tending to indicate that heat is not a factor in polishing but the consequence of the polishing operation. The data on this test is given in the following table.

*Table II*

| Operating Temperature, ° F. | Lens Surface Temperature, ° F. | Polishing Time, minutes |
|---|---|---|
| 117 | 125 | 90-95 |
| 76 | 98-105 | 90 |

In the above test the polishing lap material was cellulose acetate molding composition in granule form. The abrasive was rouge and water, the spindle speed was 132 R. P. M. and the weight on the spindle was 4½ pounds.

The effect of spindle speed on polishing time is given by the data in the following table. This data was obtained by a test using a polishing lap of cellulose acetate molding composition in granule form, with an abrasive of rouge and water. The operating temperature was 76-78° F. and the weight was 12½ pounds.

*Table III*

| Spindle Speed, R. P. M. | Lens Surface, Temperature, ° F. | Polishing Time, minutes |
|---|---|---|
| 64 | 95-100 | 110-120 |
| 132 | 100-105 | 60-70 |
| 250 | 110-115 | 30 |
| 600 | 140-150 | 11-12 |

A spindle speed of 600 R. P. M. was the highest used because this was the top speed of the machine available for this test. The relatively high temperature obtained when operating at these higher spindle speeds has not been found to appreciably affect the test of a lens when cooled and this is probably because the entire piece of glass is uniformly raised in temperature rather than just the surface being worked.

I have further found that faster polishing is obtained with a cellulose derivative lap if a roughened working surface is formed and maintained thereon. This was discovered more or less by accident when a plastic polisher under test glazed over due to the fact that a composition was chosen for a job which did not have sufficient hardness. The only reason which I can advance for the fact that a roughened surface polishes where a smooth one won't is that it allows for better circulation of the abrasive over the work and possesses a plurality of depressions which facilitates the plastic gripping the particles of abrasive and thereafter acting as a holder therefor. Accordingly, great pain is taken to obtain a roughened working surface on the plastic lap when it is formed, and due to the fact that these plastics have no apparent flow this roughened surface will remain throughout the life of the lap. This characteristic further distinguishes the present abrading lap from conventional "pitch" laps for the reason that the latter generally are made with smooth working surfaces and this may be one reason for their presently discovered inefficiency.

One way in which the desirable roughened surface may be obtained on the working face of the lap is to stipple or roughen the face of the forming die which is used to press the working face in the lap. The roughened surface of the lap should preferably not have sharp corners, but all edges of rises and indentations should be rounded. A suitable surface is one which is corrugated, with the corrugations running in all directions, or a surface which is roughened like an orange peel, only with the roughness being a little more pronounced.

To obtain this roughened surface, granules of a cellulose derivative plastic have been heated in an oven to about 10° F. below the softening point specified by the manufacturer. The "shell" upon which they are are to be mounted is then heated to somewhat above the melting point specified so as to completely fuse the under layer while the top surface is still about 10° F. below the melting point. Molding and cooling under pressure with the same material but a temperature gradient across that material results in good adherence of the plastic mass to the "shell" and a roughened working surface on the polisher.

It is not always possible to reproduce one's results by this technique, as it is difficult to know just when the "shell" is hot enough to fuse the under surface plastic while the upper regions are still below the melting temperature. Polishers are usually about 3 m. m. thick and this temperature gradient is critical for best results. In this connection, I have found that one way of making a plastic polishing lap that has sufficient adhering properties to stick to the iron "shell" and still present a desired roughened working surface is to use two compatible plastic materials having different softening points. For instance, take granules of cellulose acetate butyrate molding composition of the same formula, or of different formulas so long as they are compatible, and select granules having two different softening temperatures. A layer of the lower softening point granules would then be placed next to the material on which it is desired to adhere (the "shell") and a thin layer of granules of the higher softening point would then be placed on top of the first layer. The granules are then heated slightly above the softening temperature of the lower melting granules and slightly below the softening temperature of the higher melting granules. Having the same chemical properties except for a change in plasticizer, the two layers of granules will fuse to each other, but the softer layer will adhere to the "shell" whereas the upper layer, which is still only semi-soft, will, after molding, present the desired roughened surface. The same roughened surface can be obtained by the use of powdered plastic material if a cold forming tool is used, because this tends to freeze the surface particles in their original form rather than fusing them down into a smooth surface. It is oftimes desirable to have an easy means of identification of the polishers both for flow temperature and for curvature. This can be done by using plastic granules or powder of different colors, since commercial plastics are supplied in a wide range of colors at each flow temperature.

It is pointed out that the flow characteristics specified by manufacturers for commercially available plastics cannot be relied upon in selecting a material which will satisfactorily serve as an abrading member under known operating conditions. On the contrary, each plastic composition must be more or less chosen for each job by trial and error, and after a composition has been found satisfactory for a given job the problem of selection for that job is forever settled. For instance, if it is known that when polishing a given lens at a 600 R. P. M. spindle speed with a 12½-pound weight on the polisher, the lens surface temperature of 140–150° F. is encountered it would seem logical that any plastic having a specified flow temperature above 175° F. should be suitable. However, this is not true, because it has been found that a plastic having a flow temperature of 272° F. as specified by the manufacturer has evidenced flow under the specified abrading conditions which rendered it unsuitable for use as a polishing lap. This fact is recognizable when it is understood that the standards used by the plastic manufacturers to determine flow temperatures are directed to molding technique rather than conditions encountered when the material is used as in an abrading capacity. For instance, flow temperatures as used by plastic manufacturers are the temperatures required to produce one-inch of flow using 1500 pounds per square inch of pressure and a time of 2 minutes. When the plastic is used as an abrading lap, however, there is more than temperature that must be considered. There is in addition to temperature a downward pressure and a rubbing action working in all directions, and which rubbing action introduces a positive pull effect in addition to a frictional effect due to the action of the imbedded abrasive particles. There is, therefore, a decided distorting effect on the plastic, in addition to temperature, which the normal specifications of plastic manufacturers do not account for, and these effects will vary with the kind of abrasive, the amount of abrasive, the temperature, the kind of glass, and other conditions too numerous to mention.

I have further found that the cellulose derivative plastics suitable for polishing laps possess sufficient rigidity so that the entire lap can be molded therefrom, thus doing away with the iron "shell" heretofore used as a support for "pitch" lapping surfaces. The metal socket for the ball on the driving spindle can be molded into or otherwise mechanically affixed to the plastic lap. In Figs. 3 and 4 I have shown two polishing laps made entirely of a cellulose derivative plastic material. In Fig. 3 a lap is shown for polishing a concave lens surface and with the metal socket insert 20 affixed to the lap by a threaded connection; while in Fig. 4 a plastic lap is shown for polishing a convex lens surface and with the metal socket insert 20' molded directly into the plastic lap during the molding operation thereof. The purpose of the metal socket insert is to provide a sufficiently hard surface to withstand the wear of the spindle pin during the polishing operation. In Fig. 3 the bearing insert 20 is shown as being of conical shape to frictionally engage a recess in the end of a rotating spindle. Such a bearing connection would be used in place of the conventional ball-and-socket connection when the polishing lap is to be mounted below the work and on the driven spindle.

Different techniques may be practiced in making these complete plastic laps. The plastic material may be molded roughly to the desired curvature, including the metal socket insert, and the working surface could then be machined to the desired curvature. The working surface could be molded to the final shape during the molding of the complete piece. Or the plastic could be obtained in solid stock form of desired size and be completely machined to shape, the metal insert having a self-tapping thread or being threaded into a tapped hole provided in the body of the lap. Complete plastic polishing laps not only eliminate the cost and upkeep of conventional cast-iron "shells" but effect a great saving in material. When the plastic laps are no longer satisfactory for use, they may be readily broken, and the metal inserts recovered for subsequent use. Thermoplastic materials can be reheated and repressed to any desired curvature, or, if broken up, can be remolded in the same manner as the original material. Machined shavings now considered scrap in iron parts can be reclaimed in thermoplastic materials and reheated for molding.

Due to their high resistance to flow, I have found that cellulose derivative plastics can be used as abrading tools on a curve generator type of grinding machine which runs at excessively high speed, as compared with conventional grinding machines. Curve generator types of grinding machines are well known in the art and, therefore, need not be shown in the drawings. This type of machine is different from the type of grinding and polishing machine heretofore referred to in that the work and tool spindles are both rigid, and are both power driven, as distinguished from the conventional grinding and polishing machine described wherein the lap is oscillated over the work and only one spindle (the work) is power driven. The grinding machine well known in the art as the Blanchard grinder is a typical example of a curve generator type of grinding machine although it has parallel spindles and is limited to plano work. In this type of machine, as is well known, the abrading tool is generally in the form of an annulus and is brought into engagement with the surface being generated with its axis at an angle to the axis of the work where curved surfaces are being ground. Up to the present time, due to their high speed of operation, these machines have been used only for grinding purposes and the abrading wheels have been cutting materials such as diamond dust embedded in metal rings, etc. With the advent of a cellulose derivative plastic abrading tool according to the present invention which will withstand the high spindle speed used, these curved generating machines can be used for very high speed polishing surfaces. I have run thermoplastic polishing laps up to 5000 R. P. M. on this type of machine without having them show any kind of breakdown.

Another unusual and unexpected result which I have found can be obtained by the use of a cellulose derivative plastic material as an abrading lap is in the chaarcter and time of the fine grind obtained on a piece of work when a lap of this material is used in the fine grinding operation instead of a cast-iron "shell" as is the usual procedure.

The usual procedure in the fabrication of a lens is to first mold a mass of glass roughly to shape. Then the surfaces are first rough ground to remove the irregularities resulting from the molding step and to bring the surface approximately to the desired contour. Then the rough ground surface is fine ground to reduce the roughness resulting from rough grinding and to prepare the surface for polishing which is the next and final operation. The fine grinding operation is carried out by a lap and grinding machine essentially the same as that used in polishing. The only differences are that in grinding the lap is a metal "shell," generally cast-iron, and the abrasive material is an emery sludge instead of rouge, 1200 mesh emery being the grade of emery generally used in obtaining the fine grind. It will be appreciated that the fine grinding operation is a very important step for the reason that it brings the surface being abraded approximately to the final contour desired and the character of the fine grind surface directly affects the amount of polishing that is required to polish out the piece.

I have found that the substitution of a cellulose derivative molding composition for the cast-iron fine grinding lap will give a much finer ground surface for a given grain size of emery than the grind obtained with a metal lap. It also eliminates scratches which sometimes occur when the glass gets down on the iron due to insufficient emery between the surfaces. These advantages result in a decreased polishing time which is the final procedure in the finishing of optical surfaces on glass. Although I am not certain just why the thermoplastic lap gives a finer ground surface than a cast-iron "shell" when using the same operating speeds and the same grade of abrasive, I believe it is due to the fact that the thermoplastic material allows the emery or other abrasive, under pressure, to imbed itself in the lap.

Fine grinding with a cast-iron "shell" or lap leaves a definite characteristic "grayness" on the glass surface which cannot be improved by increasing the fine grinding time, and which "grayness" must be removed in the polishing step. The term "gray" when used in describing the appearance of an abraded glass surface does not mean there is present a foreign material having a gray color but refers to the appearance of a surface which is not completely polished and in which residual pits, scratches and digs are still visible. Furthermore, this "grayness" in surface prohibits the use of a test plate in testing the surface for curvature and makes it necessary to rely upon a spherometer for checking the curvature. This is a definite disadvantage because spherometers are far from accurate when close tolerances are specified. On some types of work where the tolerances are close, it has been common practice to polish the fine grind surface just sufficiently to remove the "grayness" so that a test with a test plate could be made. This felt polishing step was not to finally polish out the surface but to clear up the "grayness" sufficiently so that a test plate could be used. It will be appreciated that these felt polishing steps, though each involves only a few minutes, increase the necessary overall time of finishing a lens, especially when it is considered that many of these might be required before the proper fine ground surface is finally obtained.

I have found that a cellulose derivative plastic lap when used for fine grinding does not leave this characteristic "gray" surface on the glass but gives a fine grind surface which is bright enough to permit a test to be made with a test plate. This not only cuts down the fine grinding time, in that the periodic felt polishing for test purposes is eliminated, but directly results in a decided reduction of final polishing time required as this "grayness" of the surface does not have to be removed during the polishing operation. In addition, since it is possible with a plastic lap in fine grinding to obtain a fine ground surface that is very close to test, polishing time required to meet the test is accordingly reduced.

The data in the following table shows the effect of fine grinding with a cellulose derivative plastic lap on the final polishing time of a given lens element.

Cellulose acetate butyrate grinding lap fine ground at 600 R. P. M.

Cellulose acetate polishing lap granules, polished at 600 R. P. M.

Cast iron grinding shell—ordinary cast iron, fine ground at 120 R. P. M.

Grinding abrasive—1200 emery.

Polishing abrasive, rouge in water.

*Table IV*

| Material of Grinding Shell | Polishing Time |
|---|---|
| Cellulose acetate butyrate molding composition: | *Minutes* |
| Fine grind of 5 minutes | 5–7 |
| Fine grind of 17 minutes | 1 |
| Cast Iron: Regular fine grind of 40 minutes | 11–12 |

The fine grind times in the above table are not too significant as to the saving in time because the plastic grinding lap was driven five times as fast as the cast-iron lap or "shell." They are significant, however, from the standpoint that in 5–17 minutes it was possible to obtain a fine-ground surface with a plastic lap which was free from "grayness" while no matter how long the surface is ground with a cast-iron lap it will show a definite characteristic "grayness." The saving in polishing time resulting from not having to remove this characteristic "grayness" is clearly evident. There are two possible reasons why the polishing time on the element fine-ground for 17 minutes was so much less than that fine ground for 5 minutes. One reason is that the longer grinding time brought the surface closer to the desired test and the amount of polishing required to meet the test was accordingly reduced. The second reason is that in 5 minutes fine grinding the roughness left by the initial rough grinding operation had not been reduced to the final characteristics of a 1200 emery with a plastic lap whereas the 17 minute fine griunding time had reduced the initial rough grinding operation to the final characteristics of the 1200 emery.

It will be apparent from the data set forth in this last table that the combined use of a cellulose derivative plastic for the fine grinding lap and for the polishing lap will result in a reduction in the overall abrading time required to produce a polished lens surface meeting a given test which is phenomenal. For instance, compare the 210-225 minute polishing time in Table I for a lens fine ground with a cast-iron lap and polished out by a conventional "pitch" with the one minute polishing time of the lens of the last table which was fine ground and polished out with cellulose derivative plastic laps and the speeds of operation allowed by the use thereof.

Since the cold flow of cellulose derivative plastic polishing laps is practically nil, it is necessary to control tests by the use of "swing" and "weight" rather than "cutting" such as is generally done with "pitch" polishers. Once a plastic polisher has been cut to correct a lens, it will not be correct for any subsequent lens. It is, therefore, advised that only in cases of extreme necessity should these plastic polishers be scraped, and then only very slightly. The diameter for the polisher for each size of lens has to be determined when the job is first started, and once this has been determined all subsequent polishers will be made the same size. This is the same procedure followed with "pitch" polishers.

Another additional advantage of the plastic polishers reported by operators is that they can change the test of the lens surface from "high" to "low," which is difficult and ofttimes impossible with the conventional "pitch" polishers due to the softness of the same. It has eliminated the necessity for regrinding lenses where tests during polishing have passed the high tolerance. Elimination of regrinding not only saves regrinding time, but the polishing time for the regrind as well.

Other advantages of cellulose derivative plastic laps over conventional "pitch" laps are as follows: Conventional "pitch" and wax materials are made from natural occurring raw materials, such as asphalt, rosin, beeswax, etc. These materials have no definite chemical composition from batch to batch, and it is, therefore, difficult to compound polishers day in and day out with the same characteristics. Continued heating of the materials changes their properties, and this factor is made use of in the manufacture of suitable polishing material in order to obtain a desired "temper" or cold flow. The cellulose derivative plastics mentioned in the specification, on the other hand, are manufactured from cellulose extracted from cotton linters, and the chemical and physical properties of the materials are very definite and are controlled from batch to batch. A polisher can be made at any time from this material with the certainty that its characteristics are exactly the same as any previous polisher. It is strictly a thermoplastic material, and may be heated and reheated indefinitely with no change in property within the range of temperature specified by the manufacturer. Any scrap or waste material can be regranulated and remolded with the assurance that it will have the same properties as the original material. Scrap or waste "pitch" is usually thrown away because another heating would change its original properties.

I have pointed out above how the substitution of cellulose derivative plastic materials for conventional "pitches" in polishing laps and for cast-iron in grinding "shells" or laps makes possible a revised grinding and polishing technique for finishing optical surfaces on glass and which technique results in a phenomenal saving in polishing time and is conducive to more accurate work. The use of these plastic materials for abrading laps not only results in a great saving of time, but also results in a reduction in the cost of material when figured per lens produced.

It has been pointed out how a cellulose derivative plastic material can be substituted for "pitch" in a polisher, for the cast-iron shell in fine grinding, or be substituted for the grinding tool on a curve generator type machine to adapt such a machine for high-speed polishing. In each instance, the plastic abrading lap is not relied upon to do any abrading itself but serves only to hold an abrasive medium on a surface to be abraded and to move the abrasive over said surface in a definite curved or flat path. Accordingly, to distinguish the present invention from the use of abrading tools which incorporate the abrasive therein and breakdown in effecting the desired abrading action, I have referred to an abrading member constructed in accordance with the present invention as an abrading lap. Therefore, throughout the specification and claims where an abrading lap is referred to I mean an abrading tool which requires the abrasive material to be applied between it and the work, and wherein the abrading tool serves only to hold the abrasive, so applied, on the work and to move it thereover in the defined path, as distinguished from an abrading tool in which the abrasive is directly incorporated in the tool itself which must break down as abrading action progresses. The term "abrading lap" as used, therefore, excludes abrading tools such as diamond wheels, emery wheels, etc., or any tool in which the abrading action is derived solely from an abrasive bonded together in a mass and which bonding material is capable of breaking down to continually present new abrasive particles to the surface of the tool.

Although I have shown and described certain specific embodiments of my invention, I am fully aware that many modifications thereof are possible. My invention, therefore, is not to be limited to the precise details of the specific embodiments disclosed but is intended to cover all modifications coming within the scope of the appended claims.

Having thus described my invention, what I claim as new and desire to secure by Letters Patent is:

1. An abrading lap for the cold working of solid optical material for producing an optical surface thereon having a working surface consisting of a thermoplastic cellulose derivative molding composition.

2. An abrading lap for the cold working of solid optical material for producing an optical surface thereon comprising a body consisting of a thermoplastic cellulose derivative molding composition and having a working surface corresponding in shape to the optical surface that is desired.

3. An abrading lap according to claim 2 in which the cellulose derivative plastic material is one, the base material of which is a cellulose acetate ester.

4. An abrading lap for the cold working of solid optical material for producing an optical surface thereon comprising a cellulose derivative plastic body having a working surface corresponding in shape to the optical surface that is desired, and in which the plastic is one, the base material of which is a cellulose acetate butyrate ester.

5. An abrading lap according to claim 2 in which the plastic is one, the base material of which is an oxidized cellulose acetate.

6. An abrading lap comprising a metal supporting member, a layer of cellulose derivative thermoplastic material affixed to said supporting member, a second layer of cellulose derivative thermoplastic material fused to said first layer of thermoplastic and having a working surface formed therein corresponding to the shape of the surface to be abraded thereby, the second layer of thermoplastic having a higher softening point than said first layer and having a roughened working surface.

7. The method of making an abrading lap for the cold working of a solid optical material for producing an optical surface thereon, comprising the steps of placing a layer of granular cellulose derivative thermoplastic material on a metal supporting member, selecting a cellulose derivative thermoplastic material which is adapted to fuse with said first-mentioned thermoplastic material when the two are softened and pressed together and which has a softening point slightly higher than the softening point of said first-mentioned thermoplastic material, placing a layer of said selected thermoplastic material in granular form, on said first layer of thermoplastic material, heating the two layers of thermoplastic materials to a temperature which is slightly above the softening temperature of said thermoplastic forming the first layer and slightly below the softening temperature of said thermoplastic forming the second layer, and pressing the two layers of thermoplastic material together and against the supporting member with a tool which is adapted to form a working surface in the second layer of thermoplastic material which is complementary to that desired on the work while said temperature is maintained, whereby the two layers of thermoplastic material are fused together, stuck to the supporting member, and a desired roughened working surface is formed in the outer layer.

LESTER M. HICKS.

REFERENCES CITED

The following references are of record in the file of this patent:

UNITED STATES PATENTS

| Number | Name | Date |
| --- | --- | --- |
| 105,320 | Eaton | July 12, 1870 |
| 165,234 | Hyatt et al. | July 6, 1875 |
| 369,431 | Brown | Sept. 6, 1887 |
| 1,356,330 | Allen | Oct. 19, 1920 |
| 1,413,945 | Stead | Apr. 25, 1922 |
| 1,491,383 | Dey | Apr. 22, 1924 |
| 1,684,748 | Stratford | Sept. 18, 1928 |
| 2,205,466 | Caprio et al. | June 25, 1940 |
| 2,309,831 | Devol et al. | Feb. 2, 1943 |
| 2,352,178 | Bolsey | June 27, 1944 |
| 2,398,890 | Howard | Apr. 23, 1946 |

OTHER REFERENCES

Amateur Telescope Making, published by Scientific American Publishing Co., by Munn & Co. 1935, page 4.